United States Patent [19]
Miyano

[11] Patent Number: 5,349,934
[45] Date of Patent: Sep. 27, 1994

[54] EVAPORATIVE EMISSION CONTROL SYSTEM FOR INTERNAL COMBUSTION ENGINES

[75] Inventor: Hideyo Miyano, Wako, Japan

[73] Assignee: Honda Giken Kogyo K.K., Tokyo, Japan

[21] Appl. No.: 78,010

[22] Filed: Jun. 14, 1993

[30] Foreign Application Priority Data

Jun. 19, 1992 [JP] Japan .................. 4-185837
Jun. 19, 1992 [JP] Japan .................. 4-185838

[51] Int. Cl.⁵ .................. F02M 33/02; F02M 21/02
[52] U.S. Cl. .................. 123/519; 123/525; 123/553
[58] Field of Search ........ 123/518, 522, 519, 520, 123/553, 557, 525, 527

[56] References Cited

U.S. PATENT DOCUMENTS

| | | | |
|---|---|---|---|
| 3,172,348 | 3/1965 | Berg | 123/518 |
| 4,007,721 | 2/1977 | Requeiro | 123/522 |
| 4,074,666 | 2/1978 | Pierce et al. | 123/522 |
| 4,220,127 | 9/1980 | Reynolds | 123/522 |
| 4,306,531 | 12/1981 | Watkins | 123/557 |
| 4,362,130 | 12/1982 | Robinson | 123/518 |
| 4,372,280 | 2/1983 | Adams | 123/522 |
| 4,412,521 | 11/1983 | Silva, Jr. | 123/522 |
| 4,606,319 | 8/1986 | Silva | 123/557 |
| 4,641,623 | 2/1987 | Hamburg | 123/518 |
| 4,778,495 | 10/1988 | Bishop et al. | 123/519 |
| 4,829,968 | 5/1989 | Onufer | 123/518 |
| 4,836,173 | 6/1989 | Stires, Jr. | 123/557 |
| 4,846,135 | 7/1989 | Tiphaine | 123/518 |
| 4,864,103 | 9/1989 | Bishop et al. | 123/519 |
| 4,883,040 | 11/1989 | Rocky | 123/557 |
| 4,926,831 | 5/1990 | Earl | 123/557 |
| 5,021,071 | 6/1991 | Reddy | 123/518 |
| 5,048,501 | 9/1991 | Smith et al. | 123/557 |
| 5,195,495 | 3/1993 | Kitamoto et al. | 123/518 |

FOREIGN PATENT DOCUMENTS

397560  8/1991  Japan .

Primary Examiner—Carl S. Miller
Assistant Examiner—Thomas N. Moulis
Attorney, Agent, or Firm—Arthur L. Lessler

[57] ABSTRACT

An evaporative fuel emission control system for an internal combustion engine has a canister connected to a fuel tank of the engine. The canister temporarily stores evaporative fuel generated from the fuel tank. The evaporative emission control system also includes a purging passage connecting the canister and a portion of an intake passage at a location downstream of a throttle valve arranged in the intake passage. An amount of evaporative fuel is increased which is generated from the fuel tank. In a preferred form, the system includes a second fuel tank arranged between the first-mentioned fuel tank and the canister. Evaporative fuel is increased by evaporating fuel in the second fuel tank.

11 Claims, 5 Drawing Sheets

EVAPORATIVE EMISSION CONTROL SYSTEM FOR INTERNAL COMBUSTION ENGINES

BACKGROUND OF THE INVENTION

1. Field of the Invention

This invention relates to an evaporative emission control system for an internal combustion engine, which is adapted to control emission of evaporative fuel generated from a fuel tank connected to the engine.

2. Prior Art

Among evaporative emission control systems for controlling emission of evaporative fuel generated from a fuel tank into the atmosphere, there is conventionally known a type that evaporative fuel generated in the fuel tank is temporarily adsorbed by an activated carbon in a charcoal canister, before it is purged into the intake system of the engine.

Further, when the engine is started in a cold condition, it is desirable to supply a large amount of evaporative fuel to improve the startability of the engine. To this end, it has already been proposed, e.g. by Japanese Provisional Utility Model Publication (Kokai) No. 3-97560 to heat fuel adsorbed in the canister to thereby promote evaporation of the fuel.

However, according to this prior art, only the amount of fuel spontaneously evaporated in the fuel tank is heated, and hence it is impossible to generate evaporative fuel in large quantities. Therefore, evaporative fuel cannot be supplied to the engine in a desired or sufficient amount which is required e.g. at the start of the engine in a cold condition.

On the other hand, in evaporative emission control systems of the above-mentioned type, the engine is supplied with both fuel injected from fuel injection valves and evaporative fuel purged from the canister, when purging of evaporative fuel is carried out. It has already been proposed e.g. by U.S. Pat. No. 4,641,623 to control the amount of fuel injected from the fuel injection valves according to the flow rate of evaporative fuel purged while evaporative fuel is being purged into the intake system, to thereby control the air-fuel ratio of an air-fuel mixture supplied to the engine to a desired value.

Further, in the U.S. Patent, it is also disclosed to control the amount of evaporative fuel purged into the intake system to a predetermined value when the amount of evaporative fuel adsorbed in the canister exceeds a predetermined value.

However, in this prior art, the amount of evaporative fuel adsorbed in the canister is not quantitatively detected. This makes it difficult to constantly secure a predetermined amount of or more evaporative fuel to be purged into the intake system.

SUMMARY OF THE INVENTION

It is a first object of the invention to provide an evaporative emission control system for an internal combustion engine, which is capable of generating a large amount of evaporative fuel.

It is a second object of the invention to provide an evaporative emission control system which is capable of constantly securing a desired amount of evaporative fuel to be supplied to the engine.

To attain the above objects, the present invention provides an evaporative emission control system for an internal combustion engine having an intake passage, a throttle valve arranged in the intake passage, and a fuel tank.

The evaporative emission control system according to the invention is characterized by comprising:
- a canister connected to the fuel tank for temporarily storing evaporative fuel generated from the fuel tank;
- a purging passage connecting between the canister and a portion of the intake passage at a location downstream of the throttle valve; and
- evaporative fuel-increasing means for increasing an amount of evaporative fuel generated from the fuel tank.

Preferably, the evaporative fuel-increasing means includes a second fuel tank arranged between the first-mentioned fuel tank and the canister, and fuel-vaporizing means arranged in the second fuel tank.

More preferably, the evaporative emission control system includes a flow meter arranged in the purging passage at a location downstream of the canister for measuring a flow rate of evaporative fuel, and the evaporative fuel-increasing means is responsive to an output from the flow meter, for increasing the amount of evaporative fuel.

Further preferably, the evaporative emission control system includes a purge control valve arranged in the purging passage for controlling a flow rate of evaporative fuel purged, calculating means for calculating a desired flow rate of evaporative fuel purged based on operating conditions of the engine, and control means for controlling the purge control valve according to the desired flow rate of evaporative fuel purged to the intake passage.

Preferably, the evaporative fuel-increasing means includes an air supply passage for communicating between a portion of the intake passage upstream of the throttle valve and the second fuel tank.

More preferably, the evaporative fuel-increasing means includes fan means arranged in the air supply passage, and air supply control means for operating the fan means to supply air to the second fuel tank when the first-mentioned flow rate of evaporative fuel detected by the flow meter is smaller than a predetermined value.

Further preferably, the evaporative emission control system includes a circulating passage connected to a portion of the purging passage at a location upstream of the purge control valve and to the air supply passage for circulating evaporative fuel, and a valve of three-way type arranged in a joining point where the circulating passage meets the air supply passage for permitting supply of air to the second fuel tank and circulation of evaporative fuel when the fan is operating, and for closing at least the circulating passage when the fan is not operating.

Preferably, the flowmeter is arranged at a location upstream of a joining joint where the circulating passage meets the purging passage.

Alternatively, the air supply passage permanently communicates between the portion of the intake passage upstream of the throttle valve and the second fuel tank, whereby air is supplied to the second fuel tank due to a differential pressure between the portions of the intake passage upstream and downstream of the throttle valve.

Preferably, the evaporative fuel-evaporating means comprises heating means for heating the second fuel tank.

Preferably, the evaporative emission control system includes engine temperature-detecting means for detecting a temperature of the engine, and liquid ratio-determining means for determining a ratio of an amount of liquid fuel directly supplied by injection to the engine from the fuel tank to a total amount of fuel to be supplied to the engine for one explosion, based upon the temperature of the engine, and the calculating means calculates the desired flow rate of evaporative fuel, based on the ratio of the amount of liquid fuel to the total amount of fuel.

Further preferably, the evaporative emission control system includes fuel injection amount-determining means for determining a desired amount of fuel supplied by injection, based on the desired flow rate of evaporative fuel calculated based on the ratio of the amount of liquid fuel to aid total amount of fuel.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
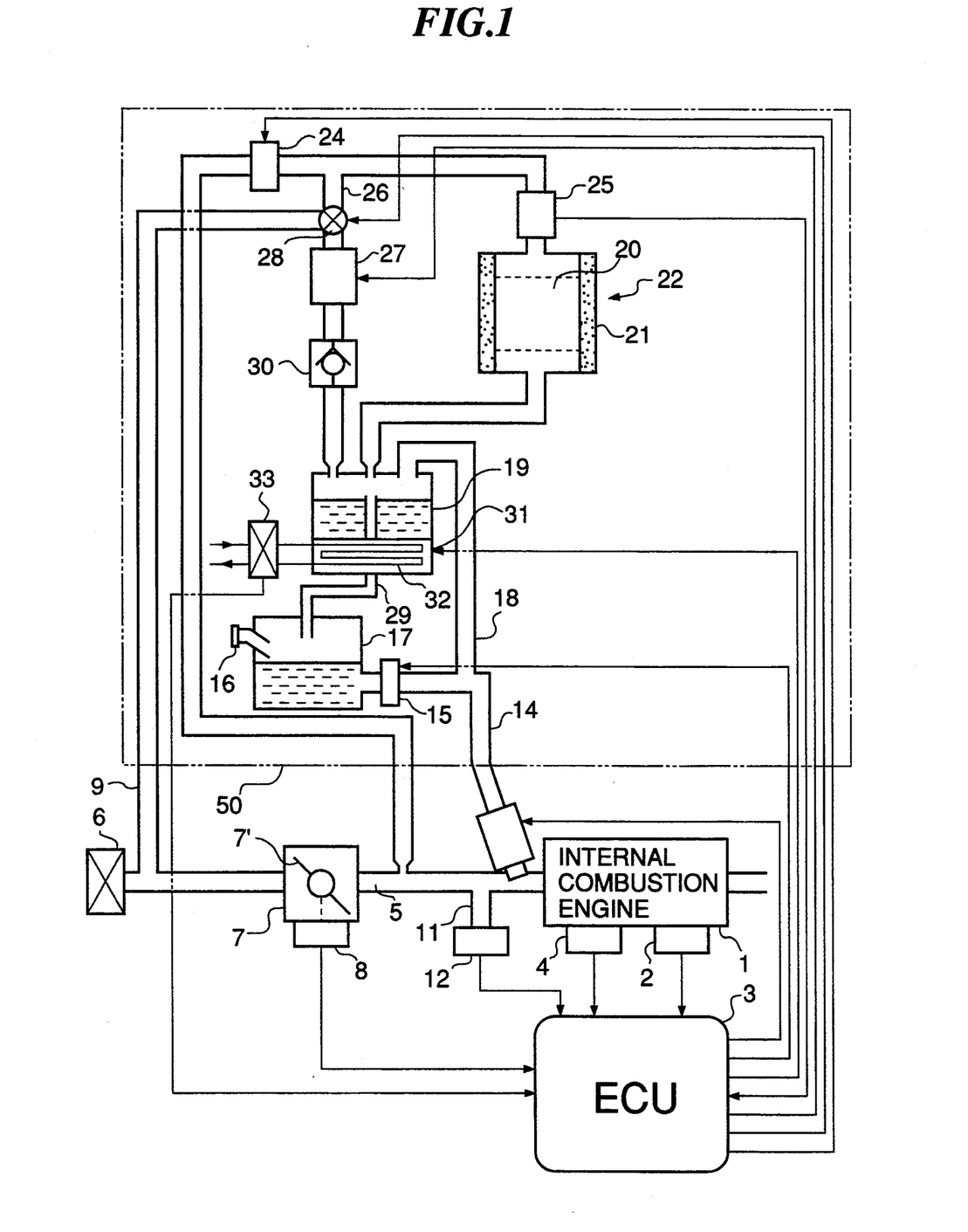
FIG. 1 is a block diagram schematically showing the whole arrangement of an evaporative emission control system for an internal combustion engine, according to a first embodiment of the invention.

Referring first to FIG. 1, there is illustrated the whole arrangement of an evaporative emission control system for an internal combustion engine, according to a first embodiment of the invention.

In FIG. 1, reference numeral 1 designates an internal combustion engine (hereinafter simply referred to as "the engine") having four cylinders, not shown, for instance. An engine rotational speed (NE) sensor 2 is arranged in facing relation to a camshaft or a crankshaft of the engine 1, neither of which is shown. The NE sensor 2 generates a pulse as a TDC signal pulse at each of predetermined crank angles whenever the crankshaft rotates through 180 degrees, the pulse being supplied to an electronic control unit (hereinafter referred to as "the ECU") 3.

An engine coolant temperature (TW) sensor 4 formed of a thermistor or the like is inserted into a coolant passage filled with a coolant and formed in the cylinder block, for supplying an electric signal indicative of the sensed engine coolant temperature TW to the ECU 3.

An intake pipe 5 having an air cleaner 6 mounted on one end thereof is connected to the engine 1. Arranged in the take pipe 5 is a throttle body 7 having a throttle valve 7' mounted therein. Connected to the throttle valve 7" is a throttle valve opening ($\theta$TH) sensor 8 for supplying an electric signal indicative of the sensed throttle valve opening $\theta$TH to the ECU 3.

An air supply pipe 9 and a purging pipe 10 branches off the intake pipe 5 at respective locations between the air cleaner 6 and the throttle body 7 and between the throttle body 7 and the engine 1. The air supply pipe 9 and the purging passage 10 are connected to an evaporative emission control system 50 described hereinbelow.

Further, an intake pipe absolute pressure (PBA) sensor 12 is provided in communication with the interior of the intake pipe 2 via a conduit 11 branching off the intake pipe 2 at a location downstream of the open end of the purging pipe 10, for supplying an electric signal indicative of the sensed absolute pressure PBA to the ECU 3.

Fuel injection valves 13, only one of which is shown, are inserted into the interior of the intake pipe 5 at locations intermediate between the cylinder block of the engine 1 and the throttle valve 7 and slightly upstream of respective intake valves, not shown. The fuel injection valves 13 are connected to a fuel pump 15 via a first fuel supply pipe 14, and electrically connected to the ECU 5 to have their valve opening periods (fuel injection periods) controlled by signals therefrom.

Connected to the engine 1 is an exhaust pipe 40, in which is arranged an exhaust gas ingredient concentration sensor (hereinafter referred to as "the LAF sensor") 41 for sensing the concentration of oxygen in exhaust gases emitted from the engine 1 and for supplying an electric signal indicative of the sensed oxygen concentration to the ECU 3.

The evaporative emission control system 50 comprises a first fuel tank 17 equipped with a filler cap 16 which is opened at the time of refueling, a second fuel tank 19 into which is introduced fuel from the first fuel tank 17 via a second fuel supply pipe 18 branching off the first fuel supply pipe 14, a canister 22 accommodating activated carbon 20 as an adsorbent and having its periphery covered with a heat-storing material 21 such as zeolite and a charcoal trap, a purge control valve 24 arranged in the purging pipe 10 connected to the canister 22, an evaporative fuel flow meter 25 arranged in the purging pipe 10 at a location upstream of the purge control valve 24 (immediately downstream of the canister 22), a communication pipe 26 having one end thereof branching off the purging pipe 10 at a location between the purge control valve 24 and the evaporative fuel flow meter 25 and the other end thereof opening into the second fuel tank 19, a fan or blower 27 arranged in the communication pipe 26, and a selector valve 28 arranged in the communication pipe 26 at a location upstream of the fan 27 for selecting passages for flow of air and evaporative fuel, which are formed by the air-supply pipe 9 and the communication pipe 26. The selection valve 28 opens in three ways when the fan is in operation, to thereby allow air to be supplied from the air-supply pipe 9 to the second fuel tank 19 and at the same time part of a mixture of air and evaporative fuel purged to circulate from the purging pipe 10 upstream of the purge control valve 24 to the second fuel tank 19 to prevent an excessive flow of air from being supplied to the second fuel tank 19. When the fan 27 is in stoppage, the selector valve 28 is switched into a position to close the passage for circulation of the mixture. By virtue of operation of this selector valve of three-way type, even when the opening of the purge control valve 24 is small, the evaporative fuel flow meter 25 can detect a predetermined or larger rate of flow of evaporative fuel, because of circulation of the mixture, and this makes it possible to increase the amount of evaporative fuel in a controlled manner. Reference numeral 29 designates a return pipe which is disposed such that fuel introduced from the first fuel tank 17 into the second fuel tank 19 is returned to the first fuel tank 17 when it overflows the level of an upper open end of the return pipe 29.

The evaporative fuel flow meter 25 is electrically connected to the ECU 3 for supplying an electric signal indicative of the sensed flow rate of evaporative fuel to the ECU 3. The purge control valve 24, the fan 27, and the selector valve 28 are electrically connected to the ECU 3 to have operations thereof controlled by signals supplied therefrom. Further, a heater 31 is arranged in the second fuel tank 19 at the bottom thereof, and is electrically connected to the ECU 3 to have its operation controlled by a signal supplied therefrom. Further, the heater 31 is provided with a coolant passage 32 through which is circulated a coolant by a water pump, not shown. Reference numeral 33 designates a shut-off valve which acts to prevent the coolant from circulating through the heater 31 when the heater is not operating.

The ECU 3 comprises an input circuit having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU"), memory means storing programs executed by the CPU and for storing results of calculations therefrom, etc., and an output circuit which outputs driving signals to the fuel injection valves 13, the purge control valve 24, the fan 27, etc.

The CPU determines various engine operating conditions, such as a feedback control region and open-loop control regions, based on engine operating parameters detected by the sensors described above, and calculates the whole amount of fuel to be supplied to the engine for one explosion in terms of a fuel injection period TOUT over which each of the fuel injection valves 6 should be opened, in synchronism with generation of TDC signal pulses, by the use of the following equation (1):

$$TOUT = TiM \times KCMDM \times KLAF \times K1 + K2 \qquad (1)$$

where TiM represents a basic value of the amount of fuel supply to the engine TOUT in terms of the fuel injection period, which is set as a function of the engine rotational speed NE and the intake pipe absolute pressure PBA. A TiM map for determining the TiM value is stored in the memory means (a ROM of the ECU 3).

KCMDM represents a corrected desired air-fuel ratio coefficient which is calculated by multiplying a desired air-fuel ratio coefficient KCMD set according to engine operating parameters and representing a desired air-fuel ratio, by a fuel cooling correction coefficient KETV. The correction coefficient KETV is intended to apply a prior correction to the fuel injection amount in view of the fact that the amount of intake air varies due to the cooling effect produced when fuel is actually injected, and its value is set according to the value of the desired air-fuel ratio coefficient.

KLAF represents an air-fuel ratio correction coefficient which is set according to the oxygen concentration in exhaust gases detected by the LAF sensor 41 during a feedback control mode, and to predetermined values when the engine is in the above-mentioned open-loop control regions, respectively.

K1 and K2 represent other correction coefficients and correction variables, respectively, determined according to engine operating parameters and the battery voltage VB, and are set to such values as optimize engine operating characteristics, such as fuel consumption and engine accelerability.

In the evaporative emission control system constructed as above, when the flow rate of evaporative fuel detected by the evaporative fuel flow meter 25 is below a predetermined value, the heater 31 is operated to heat the second fuel tank 19 and at the same time the fan 27 is driven to supply air to the second fuel tank 19 to thereby cause generation of an increased amount of evaporative fuel.

Figure 2:
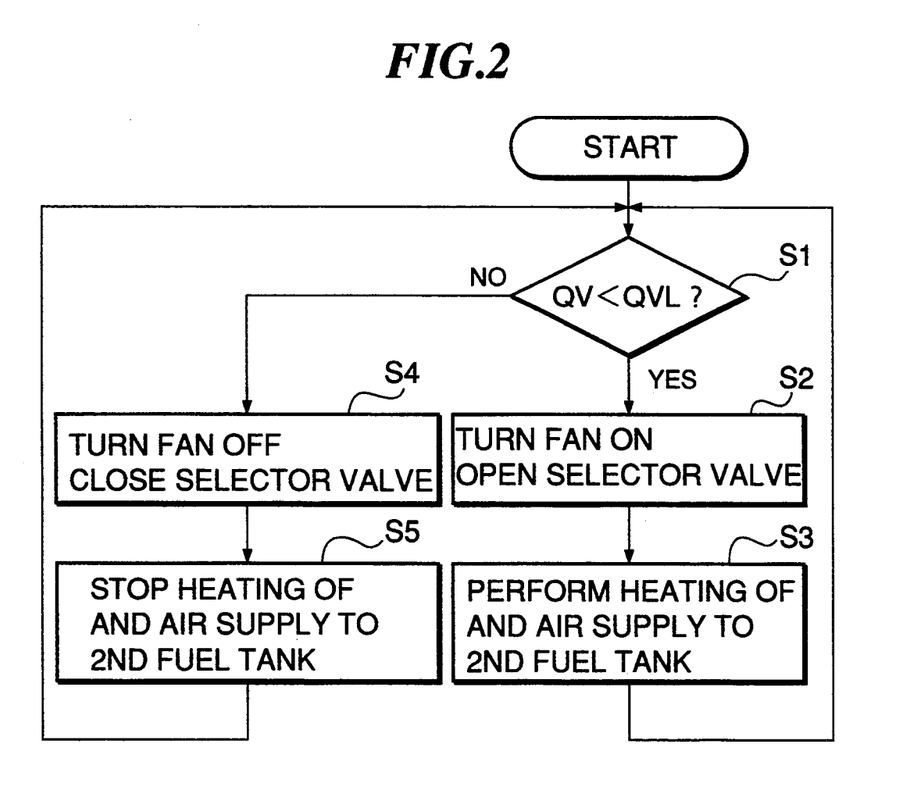
FIG. 2 is a flowchart showing a procedure of control carried out by evaporative fuel-increasing means of the system of FIG. 1.

FIG. 2 shows a program of evaporative fuel-increasing control which starts to be carried out by the evaporative emission control system according to the first embodiment, in synchronism with turning-on of an ignition switch, not shown.

First, at a step S1, it is determined whether or not a flow rate QV of evaporative fuel detected by the evaporative fuel flow meter 25 is below a predetermined value QVL. If the answer to this question is affirmative (YES), an "ON command" signal is supplied to the fan 27 to cause generation of an increased amount of evaporative fuel and the selector valve 28 is operated to allow the air to the supplied from the air supply pipe 9 and part of the mixture containing evaporative fuel to be circulated from the purging pipe 10 to the second fuel tank 19 (step S2). Then, the heater 31 is put into operation and at the same time the shut-off valve 33 is operated to allow the coolant to be circulated through the heater 31 at a step S3. That is, the heater 31 heats the second fuel tank 19 and at the same time air is forcedly supplied from the intake pipe to the second fuel tank 19 via the air supply pipe 9 and the communication pipe 26, to thereby cause generation of an increased amount of evaporative fuel in the second fuel tank 19.

Then, the program returns to the step S1, where it is determined whether or not the condition of QV<QVL is satisfied. If the answer is affirmative (YES), the steps described above are repeatedly carried out whereas if it becomes negative (NO), steps S4 and S5 are carried out, followed by returning to the step S1. More specifically, if the answer to the question of the step S1 is negative (NO), it is judged that the flow rate of evaporative fuel purged through the purging pipe 10 into the intake pipe 5 is so sufficient that a desired amount of evaporative fuel can be supplied to the engine even when the engine is started in a cold condition. Accordingly, the fan 27 is turned off at a step S4, and further the heater 31 is turned off with the shut-off valve 33 is operated to prevent the coolant from entering the heater 31 at a step S5, followed by returning to the step S1.

Thus, according to this embodiment, depending on results of detection by the evaporative fuel flow meter 25, the amount of evaporative fuel generated from the second fuel tank 19 is increased, which makes it possible to increase the amount of evaporative fuel without adversely affecting the amount of fuel injected through the fuel injection valves 13.

Figure 3:
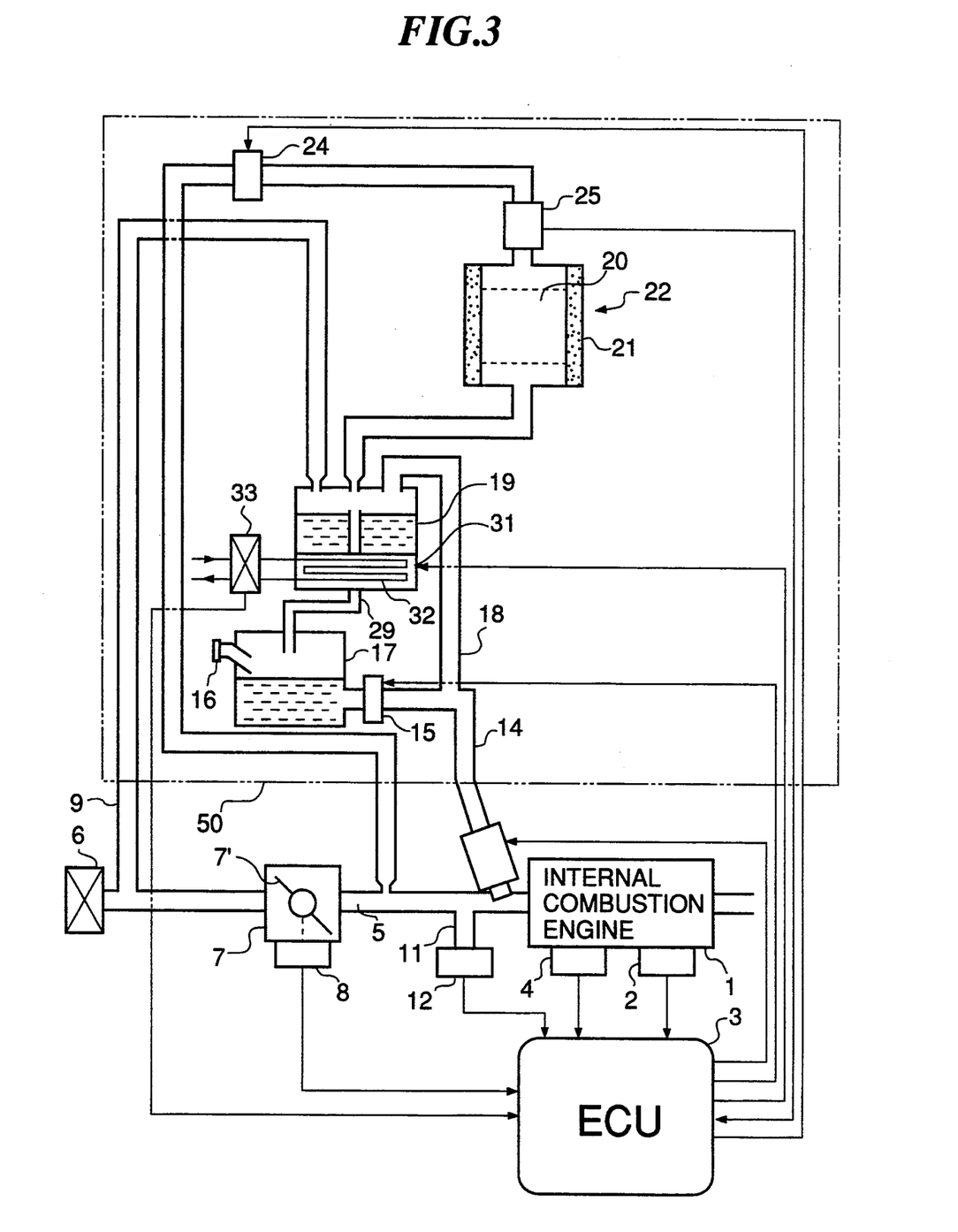
FIG. 3 is a block diagram schematically showing the whole arrangement of an evaporative emission control system for an internal combustion engine according to a second embodiment of the invention.

FIG. 3 shows a second embodiment of the invention, in which instead of providing a fan for forcible supply of air to the second fuel tank 19, air is supplied thereto due to a differential pressure between a portion of the intake pipe upstream of the throttle valve 7' and a portion of same downstream of the throttle valve 7'. More specifically, as shown in FIG. 3, according to the second embodiment, the evaporative emission control system is constructed such that instead of providing the communication pipe 26, the selector valve 27 and the check valve 30 appearing in Fig, 1, the air supply pipe 9 is directly connected to the second fuel tank 31, with the other component elements and parts being identical to those of the first embodiment. In FIG. 3 elements and parts corresponding to those FIG. 1 are designated by like reference numerals.

According to the construction of the second embodiment, at the start of the engine, at which a large amount of evaporative fuel is required, an acceleration pedal, not shown, is only slightly stepped on and hence the throttle valve opening $\theta$TH is small. Accordingly, there occurs a large level of differential pressure between the portions of the intake pipe 5 upstream and downstream of the throttle valve 7', which allows a large amount of air to be introduced from the portion upstream of the throttle valve via the air supply pipe 9 into the second fuel tank 19, to cause generation of evaporative fuel in a sufficient amount. On the other hand, when the throttle valve 7' is fully open, the amount of air introduced into the second fuel tank 19 decreases due to a small level of the differential pressure, to thereby suppress generation of an excessive amount of evaporative fuel. Further, this air supply is automatically controlled without being controlled by the ECU 3.

Further, the ECU 3 controls the operation of the heater 31 depending on the output from the flow meter 25 in a manner similar to the first embodiment described before.

Figure 4:
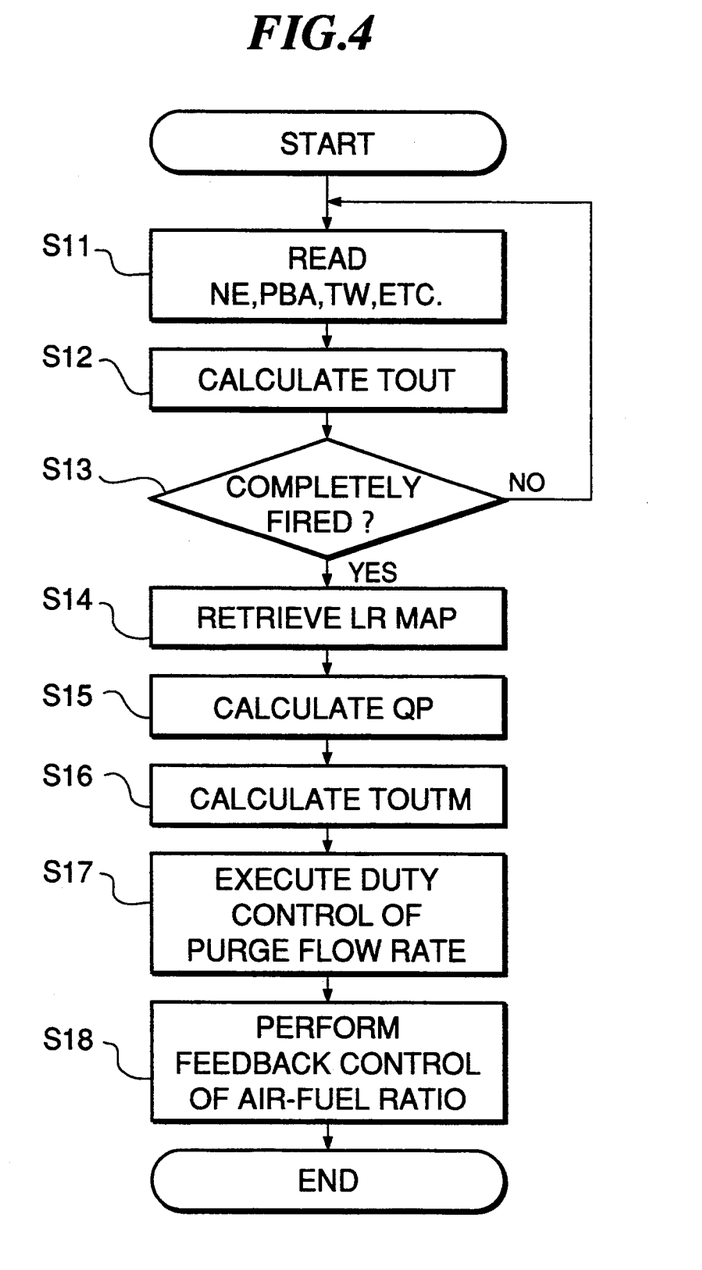
FIG. 4 is a flowchart of a routine for controlling the fuel injection period of fuel injection valves.

FIG. 4 shows a routine for controlling the fuel injection amount, which is executed in synchronism with generation of each TDC signal pulse after the lapse of a predetermined time period from the start of the engine. The predetermined time period is set to a time period which is longer than a time period required to elapse before the flow rate of evaporative fuel is increased above the predetermined valve QVL used by the FIG. 2 program.

First, at a step S11, the engine rotational speed NE, the intake pipe absolute pressure PBA, the engine coolant temperature TW, and other engine operating parameters are detected.

Then, at a step S12, the fuel injection period TOUT is calculated by the use of the equation (1) based upon the detected engine operating parameters. Then, at a step S13, it is determined whether or not the engine has reached a complete firing state. This determination is carried out by determining whether or not the engine rotational speed has continued to be above a predetermined value over a predetermined time period. If the answer to this question is negative (NO), the program returns to the step S11, whereas if the answer is affirmative (YES), the program proceeds to a step S14, where a LR map is retrieved to determine a liquid ratio LR depending on the engine coolant temperature TW. The liquid ratio LR is a ratio of an amount of fuel to be supplied by injection in terms of weight to the whole fuel supply amount, equivalent to TOUT, however, in terms of weight.

Figure 5:
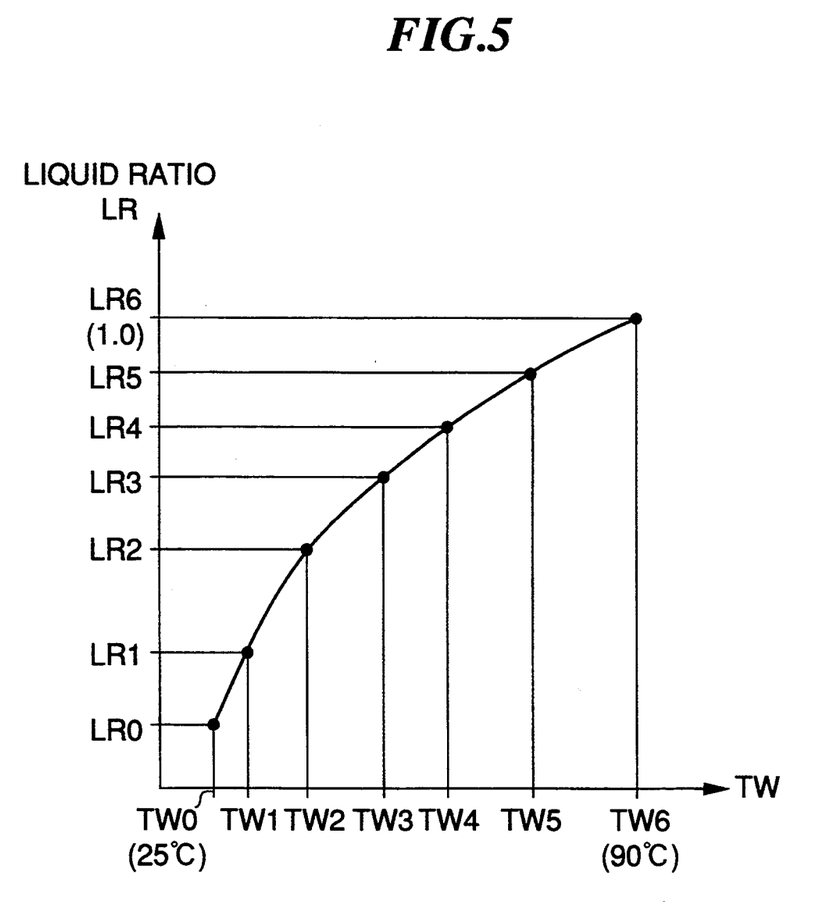
FIG. 5 shows a LR map which is used in controlling the fuel injection period.

The LR map is set, e.g. as shown in FIG. 5, such that predetermined map values LR0 to LR6 (provided that LR6=1.0) are provided correspondingly to predetermined values LR0 to LR6 (e.g. in a range of 25° C. to 90° C.), respectively. The liquid ratio LR is determined by reading a map value from this map or additionally by interpolation, if required.

Then, at a step S15, a desired flow rate of evaporative fuel to be purged is calculated by the use of the following equation (2):

$$QP = Q \times (1 - LR) \quad (2)$$

where Q represents the whole amount of fuel supply to the engine in terms of a flow rate thereof equivalent to the calculated fuel injection period TOUT.

Then, at a step S16, a corrected fuel injection period TOUTM is calculated by the use of the following equation (3):

$$TOUTM = TOUT - TP \quad (3)$$

where TP is a fuel injection period which is equivalent to the desired amount QP of evaporative fuel to be purged.

Then, at a step S17, the purge control valve 24 is controlled by a duty ratio based upon the desired amount QP of the evaporative fuel, and then at a step S18, a command signal for execution of the air-fuel ratio feedback control is outputted, based upon the corrected fuel injection period TOUTM calculated at the step S16, followed by terminating the program.

Thus, according to this embodiment, it is possible to constantly secure a desired amount of evaporative fuel to be supplied to the engine based on results of detection by the evaporative fuel flow meter, as well as to determine the flow rate of evaporative fuel to be purged and the fuel injection amount based on the liquid ratio determined according to the engine coolant temperature TW.

What is claimed is:

1. An evaporative emission control system for an internal combustion engine having an intake passage, a a throttle valve arranged in said intake passage, and a fuel tank, comprising:

a canister connected to said fuel tank for temporarily storing evaporative fuel generated from tank;

a purging passage connecting between said canister and a portion of said intake passage at a location downstream of said throttle valve; and evaporative fuel-increasing means for increasing an amount of evaporative fuel generated from said fuel tank, said evaporative fuel-increasing mean including a second fuel tank arranged between said firstmentioned fuel tank and said canister, and fuelvaporizing means arranged in said second fuel tank.

2. An evaporative emission control system according to claim 1, including a flow meter arranged in said purging passage at a location downstream of said canister for measuring a flow rate of evaporative fuel, and wherein said evaporative fuel-increasing means is responsive to an output from said flow meter, for increasing the amount of evaporative fuel.

3. An evaporative emission control system according to claim 2, including a purge control valve arranged in said purging passage for controlling a flow rate of evaporative fuel purged, calculating means for calculating a desired flow rate of evaporative fuel purged based on operating conditions of said engine, and control means for controlling said purge control valve according to said desired flow rate of evaporative fuel purged to said intake passage.

4. An evaporative emission control system according to claim 2, wherein said evaporative fuel-increasing means includes an air supply passage for communicating between a portion of said intake passage upstream of said throttle valve and said second fuel tank.

5. An evaporative emission control system according to claim 4, wherein said evaporative fuel-increasing means includes fan means arranged in said air supply passage, and air supply control means for operating said fan means to supply air to said second fuel tank when said first-mentioned flow rate of evaporative fuel detected by said flow meter is smaller than a predetermined value.

6. An evaporative emission control system according to claim 5, including a circulating passage connected to a portion of said purging passage at a location upstream of said purge control valve and to said air supply passage for circulating evaporative fuel, and a valve of three-way type arranged in a joining point where said circulating passage meets said air supply passage for permitting supply of air to said second fuel tank and circulation of evaporative fuel when said fan is operating, and for closing at least said circulating passage when said fan is not operating.

7. An evaporative emission control system according to claim 6, wherein said flowmeter is arranged at a location upstream of a joining joint where said circulating passage meets said purging passage.

8. An evaporative emission control system according to claim 4, wherein said air supply passage permanently communicates between said portion of said intake passage upstream of said throttle valve and said second fuel tank, whereby air is supplied to said second fuel tank due to a differential pressure between said portions of said intake passage upstream and downstream of said throttle valve.

9. An evaporative emission control system according to claim 1 to 3, wherein said evaporative fuel-evaporating means comprises heating means for heating said second fuel tank.

10. An evaporative emission control system according to claim 3, including engine temperature-detecting means for detecting a temperature of said engine, and liquid ratio-determining means for determining a ratio of an amount of liquid fuel directly supplied by injection to said engine from said fuel tank to a total amount of fuel to be supplied to said engine for one explosion, based upon said temperature of said engine, and wherein said calculating means calculates said desired flow rate of evaporative fuel, based on said ratio of said amount of liquid fuel to said total amount of fuel.

11. An evaporative emission control system according to claim 10, including fuel injection amount-determining means for determining a desired amount of fuel supplied by injection, based on said desired flow rate of evaporative fuel calculated based on said ratio of said amount of liquid fuel to aid total amount of fuel.

* * * * *